US012766907B2

(12) United States Patent
Deferme et al.

(10) Patent No.: US 12,766,907 B2
(45) Date of Patent: Oct. 20, 2026

(54) DAMPER ASSEMBLY INCLUDING INTAKE VALVE IN FLUID CHAMBER

(71) Applicant: Advanced Suspension Technology LLC, Northville, MI (US)

(72) Inventors: Stefan Deferme, Poort Sint-Truiden (BE); Bert Louis Jozef Diels, Geel (BE); Gert Mangelschots, Heusden-Zolder (BE)

(73) Assignee: Advanced Suspension Technology LLC, Northville, MI (US)

( * ) Notice: Subject to any disclaimer, the term of this patent is extended or adjusted under 35 U.S.C. 154(b) by 710 days.

(21) Appl. No.: 17/936,700

(22) Filed: Sep. 29, 2022

(65) Prior Publication Data

US 2024/0109390 A1 Apr. 4, 2024

(51) Int. Cl.

*B60G 17/08* (2006.01)
*B60G 13/06* (2006.01)
*B60G 15/06* (2006.01)

(52) U.S. Cl.

CPC ............ *B60G 17/08* (2013.01); *B60G 13/06* (2013.01); *B60G 15/062* (2013.01);

(Continued)

(58) Field of Classification Search

CPC .... B60G 17/08; B60G 2202/24; B60G 13/06; B60G 15/062; B60G 17/056;

(Continued)

(56) References Cited

U.S. PATENT DOCUMENTS 2,332,161 A * 10/1943 Mcintyre .................. F16F 9/48 188/315
5,085,300 A * 2/1992 Kato ....................... F16F 9/348 188/280

(Continued)

FOREIGN PATENT DOCUMENTS

CN 105358862 B * 3/2019 .............. F16F 9/348
CN 113646558 A * 11/2021 ............. B60G 13/08

(Continued)

OTHER PUBLICATIONS

Extended European Search Report regarding European Application No. 23199834.5, mailed Mar. 21, 2024.

*Primary Examiner* — Robert A. Siconolfi
*Assistant Examiner* — Mahbubur Rashid
(74) *Attorney, Agent, or Firm* — Harness, Dickey & Pierce, P.L.C.

(57) ABSTRACT

A damper includes an inner tube elongated along an axis, a piston slidably disposed in the inner tube, and an outer tube surrounding the inner tube. The inner tube and outer tube define a fluid chamber therebetween. The damper includes and intake assembly in the fluid chamber. The intake assembly includes a unitary support ring and pair of fulcrum spacers, a support post fixed to and extending along the axis away from the unitary support ring and pair of fulcrum spacers, and a valve ring supported by the support post. The valve ring defines an orifice. A valve disc is supported by the support post between the valve ring and the unitary support ring and pair of fulcrum spacers. The valve disc covers the orifice of the valve ring.

20 Claims, 9 Drawing Sheets

(52) U.S. Cl.
CPC .. *B60G 2202/24* (2013.01); *B60G 2204/4402* (2013.01); *B60G 2206/41* (2013.01)

(58) Field of Classification Search
CPC .............. B60G 13/008; B60G 2202/20; B60G 2500/11; B60G 2500/20; B60G 2500/2043; B60G 2204/4402; B60G 2206/41
See application file for complete search history.

(56) References Cited

U.S. PATENT DOCUMENTS

| | | | | |
|---|---|---|---|---|
| 11,091,001 | B2 * | 8/2021 | Cendoya | B60G 17/08 |
| 11,118,649 | B2 * | 9/2021 | Deferme | F16F 9/325 |
| 11,441,633 | B2 * | 9/2022 | Deferme | F16F 9/369 |
| 2004/0040806 | A1 * | 3/2004 | Oliver | B60G 17/044 188/315 |
| 2020/0072312 | A1 | 3/2020 | Dobinson et al. | |
| 2022/0049755 | A1 | 2/2022 | Deferme | |

FOREIGN PATENT DOCUMENTS

| | | | | | |
|---|---|---|---|---|---|
| DE | 19841857 | A1 | * | 6/1999 | F16F 9/18 |
| DE | 60302304 | T2 | * | 7/2006 | B60G 17/044 |
| DE | 112020003202 | T5 | | 3/2022 | |
| EP | 1600662 | A1 | | 11/2005 | |
| JP | 5415992 | B2 | * | 2/2014 | F16F 9/187 |
| NL | 1002426 | C2 | | 8/1997 | |
| WO | WO-2021195535 | A1 | * | 9/2021 | F16F 9/18 |

* cited by examiner

DAMPER ASSEMBLY INCLUDING INTAKE VALVE IN FLUID CHAMBER

FIELD

The present disclosure generally relates to dampers. More particularly, the present disclosure relates to a damper with external active control valves and a passive intake valve that selectively allows flow between a rebound working chamber and a compression working chamber.

BACKGROUND

Dampers for vehicles are commonly included in a wide variety of vehicle segments. Some vehicles include semi-active damping that adjusts damping levels according to road conditions and vehicle dynamics. The dampers are between a body and the suspension system of the vehicle. A piston is located within the damper. The piston is connected to the vehicle body or the suspension of the vehicle through a piston rod. As the damper is compressed or extended, fluid flows between rebound and compression working chambers within the damper to counteract vibrations. By adjusting the flow of damping fluid between the chambers, greater or lower damping forces may be generated.

DETAILED DESCRIPTION

Figure 1:
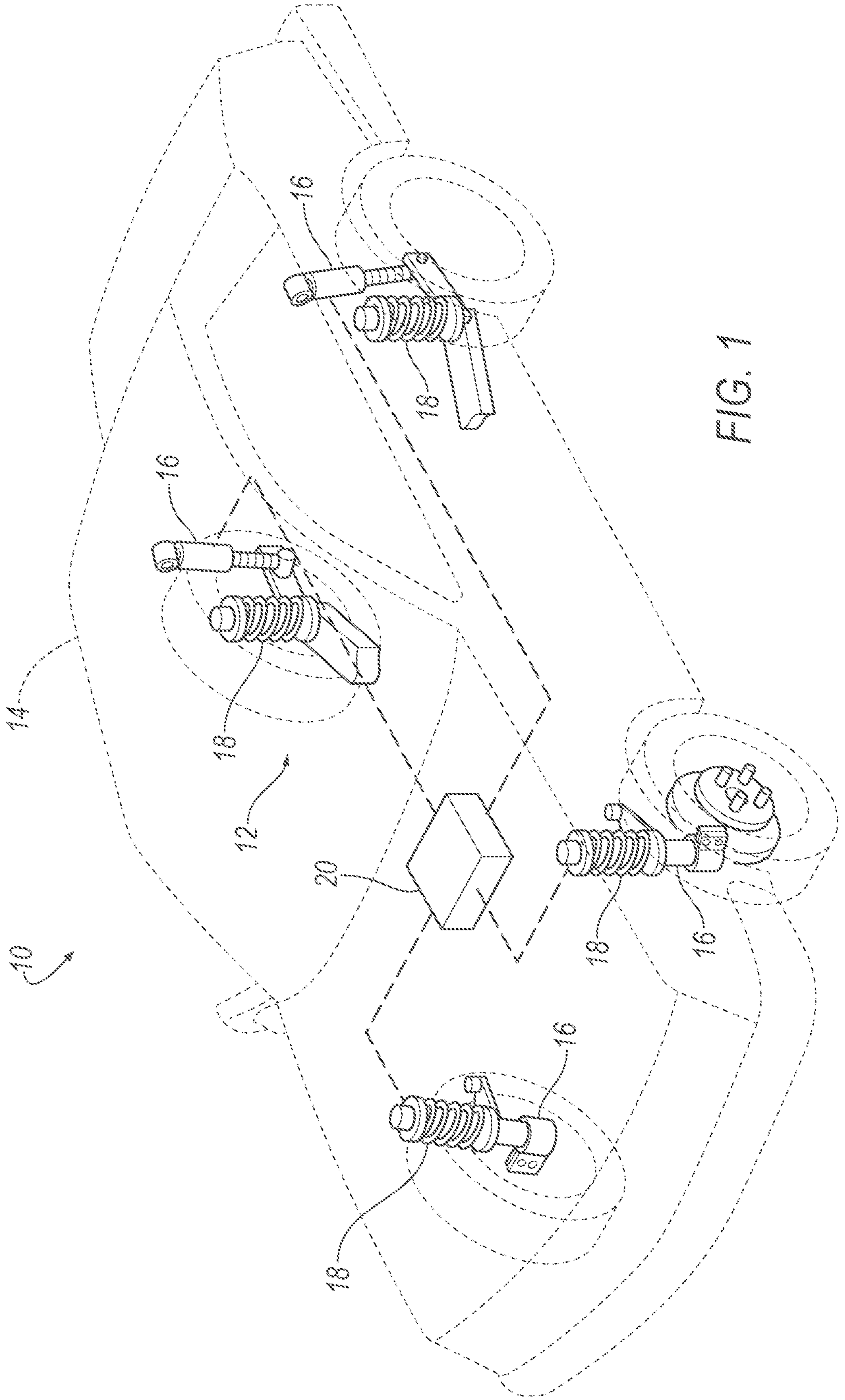
FIG. 1 is a schematic illustration of a vehicle including a suspension system having a plurality of damper assemblies.

The present disclosure relates to a damping system that may continuously adjust damping levels according to road conditions and vehicle 10 dynamics. With reference to FIG. 1 there is shown a vehicle 10 having a suspension system 12 and a body 14. The suspension system 12 includes dampers 16 and coil springs 18. The dampers 16 may be semi-active with damping levels controlled by an Electronic Control Unit (ECU 20). ECU 20 receives information (acceleration, displacement, steering, breaking, speed) from sensors (not shown) at various locations on the vehicle 10 to make independent adjustments to each damper 16.

Figure 2:
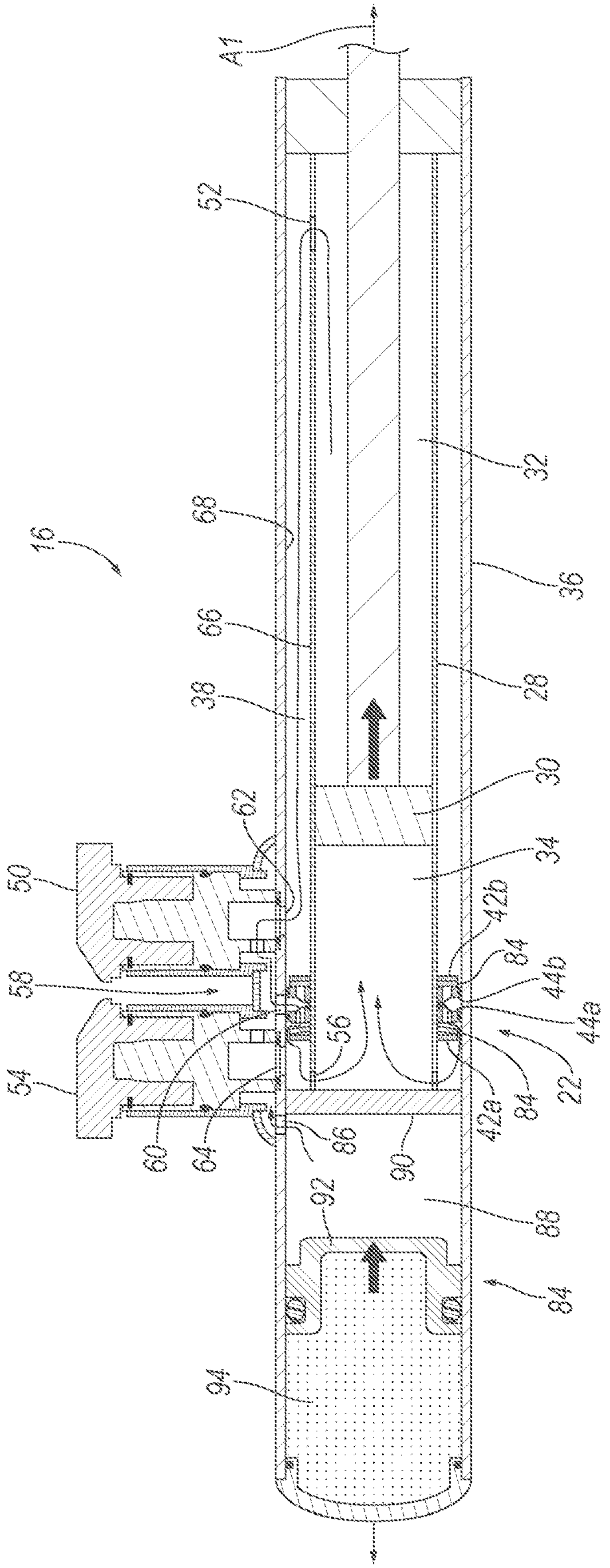
FIG. 2 is a cross-sectional view of a damper assembly in a rebound stroke.
Figure 3:
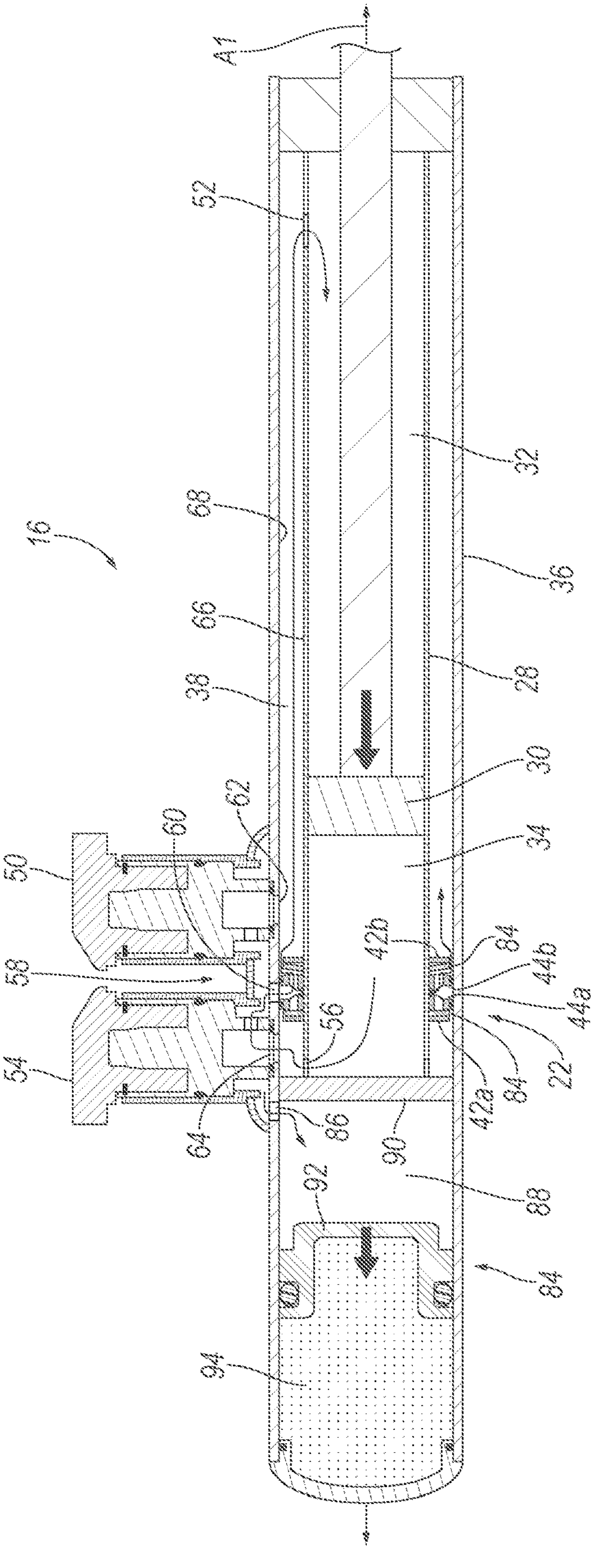
FIG. 3 is a cross-sectional view of the damper assembly in a compression stroke.

With reference to FIGS. 2 and 3 the exemplary disclosure provides a damper 16 that includes an intake assembly 22 with at least one unitary support ring 24*a*, 24*b* and pair of fulcrum spacers 26*a*, 26*b*. Unitary means a single, uniform piece of material with no seams, joints, fasteners, or adhesives holding it together, i.e., formed together simultaneously as a single continuous unit, e.g., by machining from a unitary blank, molding, forging, casting, etc. The unitary support ring 24*a*, 24*b* and pair of fulcrum spacers 26*a*, 26*b* enable increased assembly efficiencies, e.g., relative to conventional structures and methods.

The dampers 16 include an inner tube 28 elongated along an axis A1, and a piston 30 slidably disposed in the inner tube 28. The piston 30 and the inner tube 28 define a rebound working chamber 32 and compression working chamber 34. The damper 16 includes an outer tube 36 surrounding the inner tube 28. The inner tube 28 and the outer tube 36 define a fluid chamber 38 therebetween. The rebound working chamber 32, the compression working chamber 34, and the fluid chamber 38 contain a fluid, preferably a hydraulic oil suitable for use with dampers 16.

The intake assembly 22 is in the fluid chamber 38 for controlling fluid flow therein. The intake assembly 22 includes the unitary support ring 24*a*, 24*b* and pair of fulcrum spacers 26*a*, 26*b*. The intake assembly 22 includes one or more support posts 42 fixed to and extending along the axis A1 away from the unitary support ring 24*a*, 24*b* and pair of fulcrum spacers 26*a*, 26*b*. The intake assembly 22 includes at least one valve ring 44*a*, 44*b* supported by the support post 42. The valve ring 44*a*, 44*b* defines an orifice 46*a*, 46*b*. The intake assembly 22 includes one or more valve discs 48*a*, 48*b*, e.g., one or more bendable first valve discs 48*a* and one or more bendable second valve discs 48*b*, supported by the support post 42 between the valve ring 44*a*, 44*b* and the unitary support ring 24*a*, 24*b* and pair of fulcrum spacers 26*a*, 26*b*. The valve disc 48*a*, 48*b* covers the orifice 46*a*, 46*b* of the valve ring 44*a*, 44*b* and may control fluid flow therethrough.

The damper 16 includes an active rebound valve 50 in fluid communication with the rebound working chamber 32 through the fluid chamber 38 and a distal orifice 52 of the inner tube 28. The active rebound valve 50 has a variable flow resistance controllable by the ECU 20. The damper 16 also includes an active compression valve 54 that is in fluid communication with compression working chamber 34 through a proximate inner tube orifice 56. The active compression valve 54 has a variable flow resistance controllable by the ECU 20. The active rebound valve 50 and active compression valve 54 are positioned external to the outer tube 36 as shown and may be separated by a gap 58. The active rebound valve 50 and active compression valve 54 may be circumferentially spaced from each other about the outer tube 36 (not shown). The intake assembly 22 is provided within the fluid chamber 38 and may be positioned at the gap 58. The intake assembly 22 is in selective fluid communication with active rebound valve 50 and active compression valve 54 through an outer tube intake orifice 60 whereby the intake assembly 22 controls flow during a rebound and compression stroke.

The active rebound valve 50 is in fluid communication with the fluid chamber 38 through an active rebound valve orifice 62 in the outer tube 36, and with the rebound working chamber 32 through the distal orifice 52 of the inner tube 28. The distal orifice 52 fluidly communicates with the rebound working chamber 32. During a rebound stroke fluid flows from the rebound working chamber 32, out the distal inner tube orifice 56 through the fluid chamber 38, through the active rebound valve orifice 62 in the outer tube 36 into the active rebound valve 50 and through the intake assembly 22 into the compression working chamber 34 through the proximate inner tube orifice 56 into the compression working chamber 34. The active compression valve 54 is in fluid communication with the fluid chamber 38 through an outer tube active compression valve orifice 64 and the proximate inner tube orifice 56. During a compression stroke, fluid flows from the compression working chamber 34, out the proximate inner tube orifice 56, through the active compression valve orifice 64 in the outer tube 36, into the active compression valve 54, through the intake assembly 22, through the fluid chamber 38 and into the rebound working chamber 32 through the distal inner tube orifice 56.

The intake assembly 22 is supported in the fluid chamber 38 between the inner tube 28 and the outer tube 36 of the damper 16. For example, one or more components of the intake assembly 22 may be compressed between the inner tube 28 and the outer tube 36, such as to an outer surface 66 of the inner tube 28 and/or to an inner surface 68 of the inner tube 28. As other example, the one or more components of the intake assembly 22 may be fixed to the inner tube 28 and/or the outer tube 36, e.g., via weld, adhesive, fastener, etc.

Figure 4:
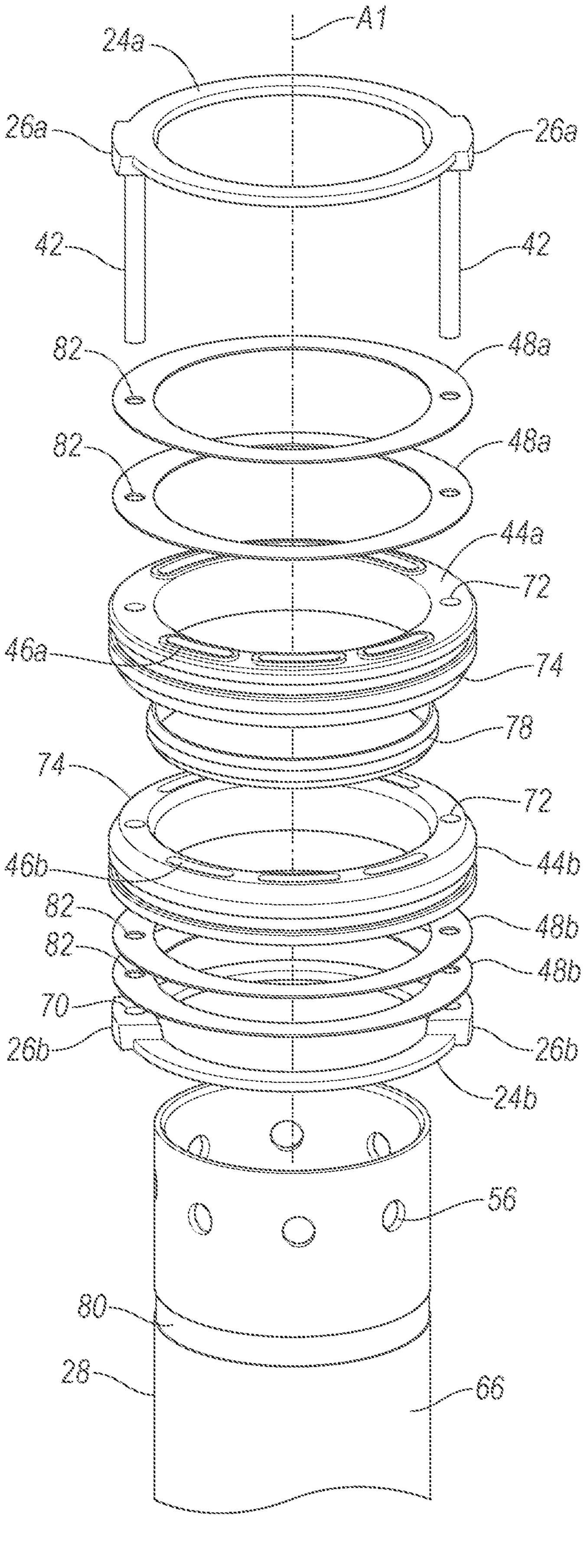
FIG. 4 is an exploded view of components of the damper assembly including an intake valve.
Figure 5:
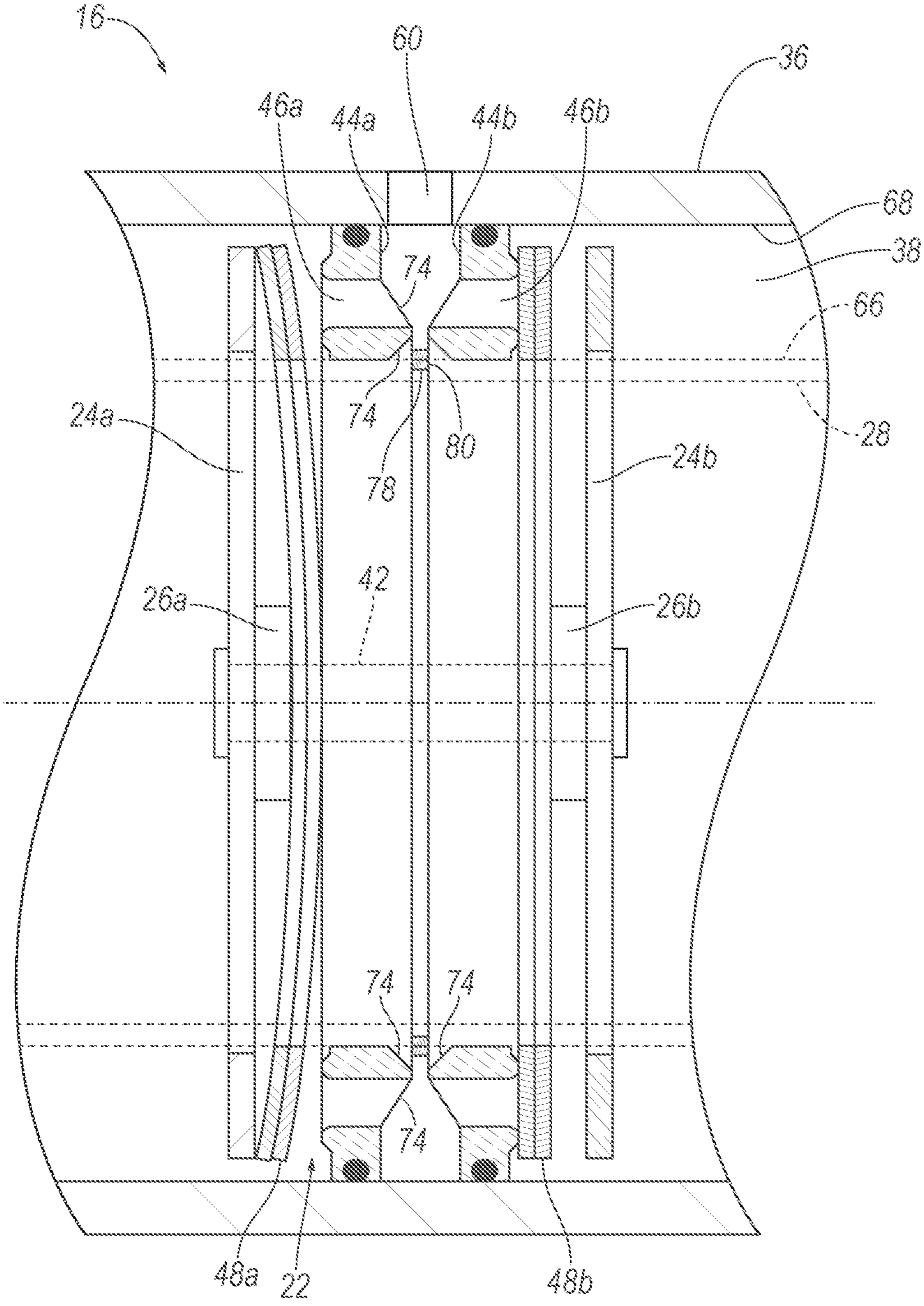
FIG. 5 is a cross-sectional view of components of the damper assembly including the intake valve.

With reference to FIGS. 4 and 5 the intake assembly 22 is shown in greater detail. The intake assembly 22 may include a first support ring 24*a* and a second support ring 24*b*. The first support ring 24*a* may be at one end of the intake assembly 22 and the second support ring 24*b* may be at an opposite end of the intake assembly 22. Other components of the intake assembly 22, e.g., the valve rings 44*a*, 44*b* and the valve discs 48*a*, 48*b*, may be disposed between the first and second support rings 24*a*, 24*b*.

The intake assembly 22 includes the fulcrum spacers 26*a*, 26*b* to enable bending of the respective valve discs 48*a*, 48*b* and provide spacing between the respective valve discs 48*a*, 48*b* and support rings 24*a*, 24*b*. The supports rings 24*a*, 24*b* and the respective fulcrum spacers 26*a*, 26*b* are unitary. For example, a first support ring 24*a* and pair of first fulcrum spacers 26*a* may be unitary with each other, and a second support ring 24*b* and pair of second fulcrum spacers 26*b* may be unitary with each other. The fulcrum spacers 26*a*, 26*b* are thicker than the support rings 24*a*, 24*b*, e.g., along the axis A1. The increased thickness of the fulcrum spacers 26*a*, 26*b* spacing between the respective valve discs 48*a*, 48*b* and support rings 24*a*, 24*b* and enables bending of the valve discs 48*a*, 48*b* toward the support rings 24*a*, 24*b*. The fulcrum spacers 26*a*, 26*b* may include two (and only two) fulcrum spacers 26*a*, 26*b* attached to each support ring 24*a*, 24*b*. The two fulcrum spacers 26*a*, 26*b* attached to the respective support ring 24*a*, 24*b* may be spaced from each other 180-degrees about the support ring 24*a*, 24*b*. In other words, the fulcrum spacers 26*a*, 26*b* may be opposite each other on the respective support ring 24*a*, 24*b*, e.g., having a diameter of the support ring 24*a*, 24*b* intersect the fulcrum spacers 26*a*, 26*b*. The intake assembly 22 may include more or less fulcrum spacers 26*a*, 26*b* connected to the support rings 24*a*, 24*b* than shown. When assembled, the fulcrum spacers 26*a*, 26*b* provide a pre-load to permit a suitable hydraulic seal such that fluid does not flow through the first valve ring 44*a*, e.g., during a compression stroke and similarly does not flow through the second valve ring 44*b*, e.g., during a rebound stroke.

The intake assembly 22 includes the support posts 42 to fix the support rings 24*a*, 24*b* relative to each other and to support other components of the intake assembly 22, e.g., limiting movement of the valve rings 44*a*, 44*b* and valve discs 48*a*, 48*b* transverse to the axis A1. The intake assembly 22 may include two and only two support posts 42, e.g., spaced from each other 180-degrees about the support rings 24*a*, 24*b*. The support posts 42 may extend away from one of the support rings 24*a*, 24*b* to the other of the support rings 24*a*, 24*b*. For example, each support post 42 may extend away from one of the first fulcrum spacers 26*a* of the first support ring 24*a* to one of the second fulcrum spacers 26*b* of the second support ring 24*b*. The support posts 42 extend along, e.g., are elongated parallel to, the axis A1.

The support posts 42 may be fixed to the support rings 24*a*, 24*b* and the fulcrum spacers 26*a*, 26*b*. The support post 42 may be press fit into holes 70 of the support rings 24*a*, 24*b* and fulcrum spacers 26*a*, 26*b*, the support posts 42 may be welded to the support rings 24*a*, 24*b* and fulcrum spacers 26*a*, 26*b*, the support posts 42 may be fixed to the support rings 24*a*, 24*b* and fulcrum spacers via fasteners or other suitable structure. For example, the support posts 42 may include threaded shafts and nuts may be engaged on the threaded shafts to urge one support ring toward the other support ring. As another example, the support posts 42 may be hollow and deformable to secure the support rings 24*a*, 24*b* to each other. In other words, the support posts 42 may provide rivets securing the support rings 24*a*, 24*b* to each other.

As described, the intake assembly 22 includes the first valve ring 44*a* and the second valve ring 44*b*. The first valve ring 44*a* and second valve ring 44*b* may have identical construction. The first valve ring 44*a* and the second valve ring 44*b* may face each other in a mirrored configuration. The first valve ring 44*a* may be spaced from the second valve ring 44*b*, e.g., along the axis A1. The first valve ring 44*a* and second valve ring 44*b* may each define respective orifices 46*a*, 46*b*. The orifices 46*a*, 46*b* may be arcuate in shape. The orifices 46*a* on the first valve ring 44*a* may be termed rebound orifices 46*a*, while the orifices 46*b* on the second valve ring 44*b* may be termed compression orifices 46*b*. The intake orifice 60 defined by the outer tube 36 may be between the first valve ring 44*a* and the second valve ring 44*b* along the axis A1, e.g., such that fluid may flow from the intake orifice 60 through the space between the second valve ring 44*b* and first valve ring 44*a* to the orifices 46*a*, 46*b*. The first valve ring 44*a* and second valve ring 44*b* may be supported by the support posts 42, e.g., between the unitary support rings 24*a*, 24*b* and fulcrum spacers 26*a*, 26*b* along the axis A1. The first valve ring 44*a* and second valve ring 44*b* may each include one or more fastening holes 72. The support posts 42 may be disposed within the fastening holes 72. The first valve ring 44*a* 54 and second valve ring 44*b* include respective tapered sections 74*a*, 74*b*. The tapered sections 74*a* may be radially outward and provide fluid access to the intake assembly 22 through the outer tube intake orifice 60. The tapered sections 74*b* may be radially inward, e.g., to apply force on a clamping ring 78 as further discussed below.

The first valve ring 44*a* and second valve ring 44*b* have an outer diameter that substantially corresponds to an inner diameter of the outer tube 36 and an inner diameter that substantially corresponds to the outer diameter of inner tube 28. As shown, a pair of O-Rings 76 may be included to seal the first valve ring 44*a* and the second valve ring 44*b* to the outer tube 36.

The intake assembly 22 may include the clamping ring 78. The clamping ring 78 may be disposed between the first valve ring 44*a* and the second valve ring 44*b*. A radially outmost surface of the clamping ring 78 may be radially inward of the rebound orifices 46*a* and the compression orifices 46*b*. The clamping ring 78 may secure the intake assembly 22 to the outer surface 66 of the inner tube 28. For example, normal forces from the tapered sections 74*b* of the first valve ring 44*a* and the second valve ring 44*b* may compress the clamping ring 78 against the inner tube 28. As another example, the clamping ring 78 may be received in a groove 80 that extends circumferentially about the outer surface 66 of the inner tube 28.

The intake assembly 22 includes the valve discs 48*a*, 48*b* to control fluid flow through the orifices 46*a*, 46*b* of the valve rings 44*a*, 44*b*. The valve discs 48*a*, 48*b* cover the orifices 46*a*, 46*b*, e.g., inhibiting fluid flow in one direction and selectively permitting flow fluid in an opposite direction. At least one valve disc 48*a*, 48*b* may abut each of the valve rings 44*a*, 44*b*, e.g., about perimeters of the orifices 46*a*, 46*b*. To allow clearance, e.g., for the valve discs 48*a*, 48*b* to move away from the orifices 46*a*, 46*b*, an outer diameter of the valve discs 48*a*, 48*b* are less than the inner diameter of the outer tube 36. Likewise, an inner diameter of the valve discs 48*a*, 48*b* is greater than the outer diameter of the inner tube 28.

The valve discs 48*a*, 48*b* may be supported by the support posts 42. For example, the valve disc may include fastener holes 82 and the support posts 42 may be disposed within the fastener holes 82. The valve discs 48*a*, 48*b* may be supported by the support posts 42 between the respective support rings 24*a*, 24*b* and valve rings 44*a*, 44*b* along the axis A1. For example, first valve discs 48*a* may be supported between the first support ring 24*a* and the first valve ring 44*a*, and second valve discs 48*b* may be supported between the second support ring 24*b* and the second valve ring 44*b*. In the example shown in the Figures, the intake assembly 22 includes two valve discs 48*a* between the first support ring 24*a* and the first valve ring 44*a* and two valve discs 48*b* between the second support ring 24*b* and the second valve ring 44*b*. The intake assembly 22 may include greater or fewer valve discs 48*a*, 48*b*.

The damper 16 may include an accumulator 84. The accumulator 84 is in fluid communication with the active rebound valve 50 and active compression valve 54 through an accumulator orifice 86. The accumulator 84 includes a low-pressure chamber 88 84 that is separated from the compression working chamber 34 by an end wall 90. The accumulator 84 80 further includes a flexible membrane 92 and a gas chamber 94. The accumulator 84 can receive or discharge fluid as is known in the art.

With reference to FIG. 2, a rebound stroke will be described in greater detail. During the rebound stroke the piston 30 moves in the direction of arrow A. As shown fluid is forced out the distal inner tube orifice 56 into the fluid chamber 38. Fluid flows through fluid chamber 38 and travels into the active rebound valve 50. As shown the fluid is held against the intake assembly 22 by a hydraulic seal of the second valve disc 48*b* against the second valve ring 44*b*. The active rebound valve 50 is controlled by the ECU 20 to provide the desired damping effect. The fluid flows from the active rebound valve 50 and through the outer tube intake orifice 60. As the compression working chamber 34 enlarges the pressure therein is less than the pressure at the inlet and the low-pressure chamber 88. This pressure difference acts on the first valve disc 48*a* to move the bendable disc 48*a* away from the rebound orifices 46*a*. The rebound fulcrum spacer 26*a* may be sized and selected to require a greater or lesser fluid pressure to bend the rebound disc 48*a* away from the rebound orifice 46*a*. As shown fluid, as necessary may travel from the low-pressure chamber 88 of the accumulator 84 through the outer tube intake orifice 60. Fluid will then flow through the proximate inner tube orifice 56 and into the compression working chamber 34 until the rebound stroke is complete.

With reference to FIG. 3, a compression stroke will be described in greater detail. During the compression stroke the piston 30 move in the direction of arrow B. As shown fluid is forced from the proximate inner tube orifice 56 and into the active compression valve 54, through fluid chamber 38 and outer tube active compression valve orifice 64. The bendable rebound disc 48*a* is held closed against the rebound orifice 46*a* by hydrostatic pressure. The fluid flows through the active compression valve 54 as controlled by the ECU 20. As the rebound working chamber 32 enlarges, the pressure therein is less than the pressure at the inlet and the pressure in the compression working chamber 34 is more than the pressure in the low-pressure chamber 88. Here, fluid enters the intake assembly 22 from the outer tube intake orifice 60 and forces the bendable compression disc 48*b* away from the compression orifices 46*b*. As shown fluid may flow into the low-pressure chamber of the accumulator 84 as needed. Fluid flows into the fluid chamber 38, through the distal inner tube orifice 56 and into the rebound working chamber 32 until the compression stroke is complete.

Figure 6:
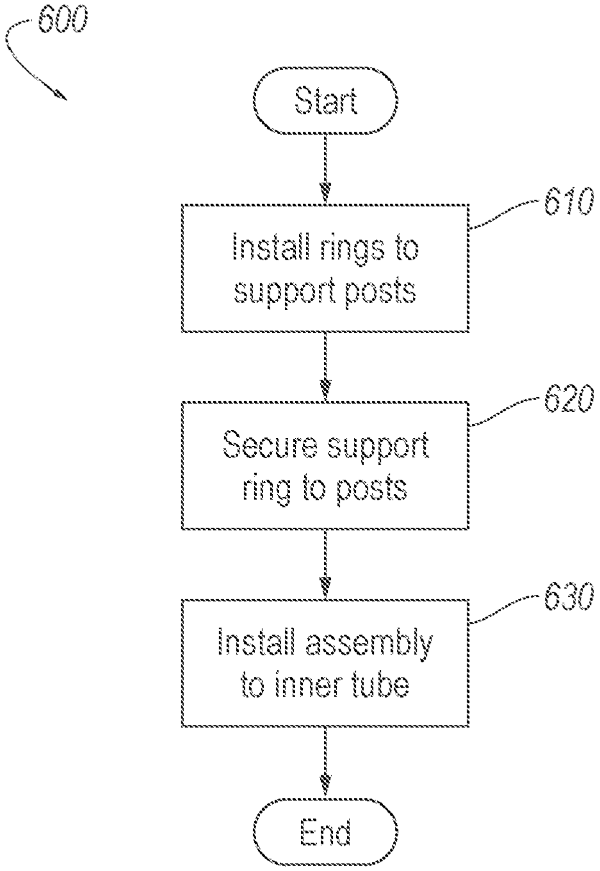
FIG. 6 is an illustration of flow chart with step to assembly the intake assembly.
Figure 7:
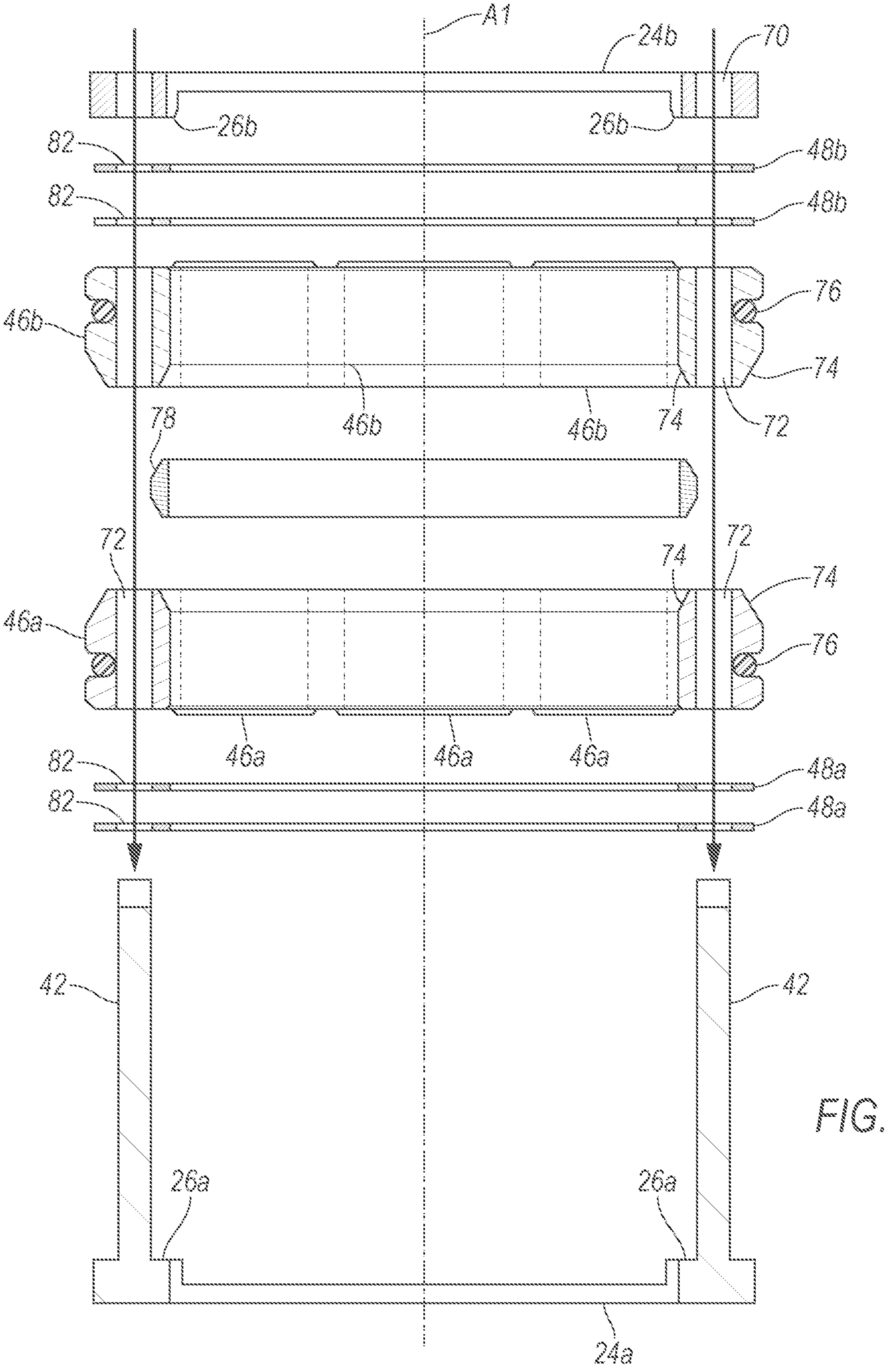
FIG. 7 is a cross-sectional of components of the intake assembly before assembly.

Turning to FIG. 6, a flow chart illustrating a method 600 of assembling the damper 16 is shown. The method 600 begins a step 610 where one or more first valve discs 48*a*, the first valve ring 44*a*, the clamping ring 78, the second valve ring 44*b*, and one or more second valve discs 48*b* are installed onto the pair of support posts 42 attached to the first support ring 24*a*. For example, and with defence to FIG. 7, the support posts 42 may be inserted into the fastener holes 82 of the first valve discs 48*a*, the fastener holes 72 of the first valve ring 44*aa* and the second valve ring 44*b*, and the fastener holes 82 of the second valve discs 48*a*, 48*b*. The first valve discs 48*a* may be between and in abutment with the first valve ring 44*a*. The second valve discs 48*b* may abut the second valve ring 44*b*.

Figure 8:
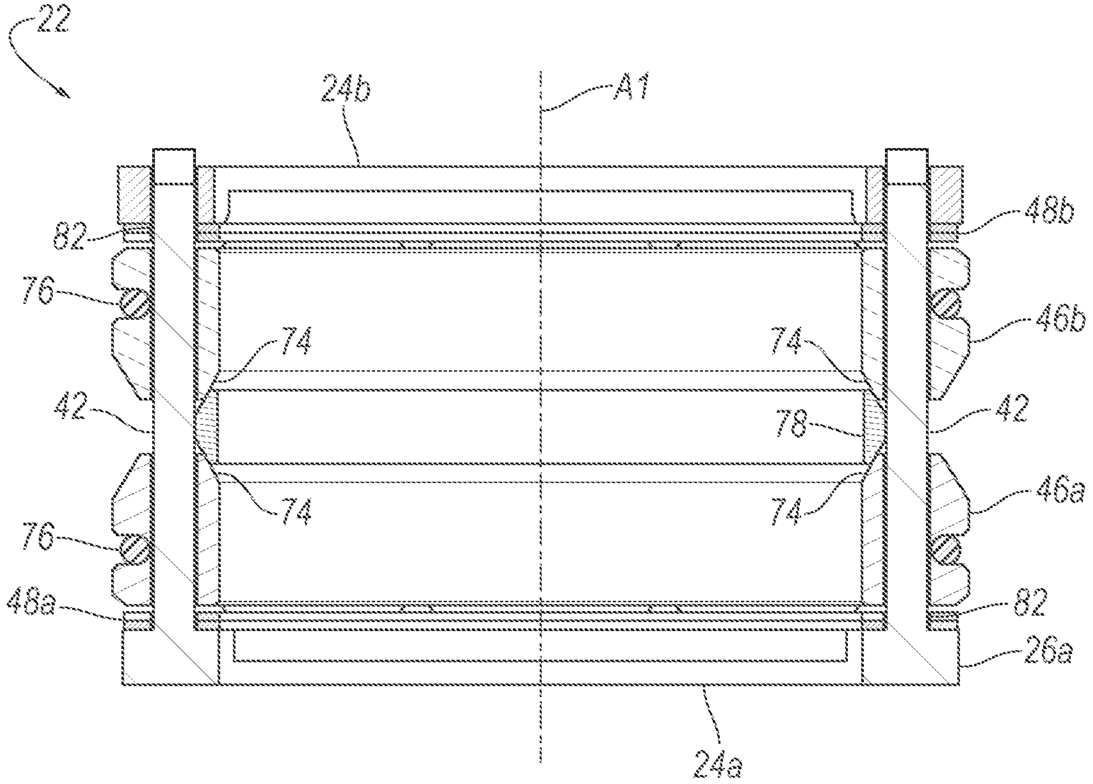
FIG. 8 is a cross-sectional the intake assembly after assembly.

Next, at a step 620, the unitary second support ring 24*b* and second pair of fulcrum spacers 26*b* are secured to the support posts 42 opposite the first support ring 24*a* to provide the intake assembly 22. For example, the unitary second support ring 24*b* and second pair of fulcrum spacers 26*b* may be installed onto the support posts 42, as shown in FIG. 8. In other words, the support posts 42 may be inserted into the holes 70 of the unitary second support ring 24*b* and second pair of fulcrum spacers 26*b*. After insertion, the unitary second support ring 24*b* and second pair of fulcrum spacers 26*b* may be fixed to the support posts 42, e.g., via weld, adhesive, friction fit, nuts or other fasteners engaged with the support posts 42, partially or fully riveting the support posts 42, etc.

Figure 9:
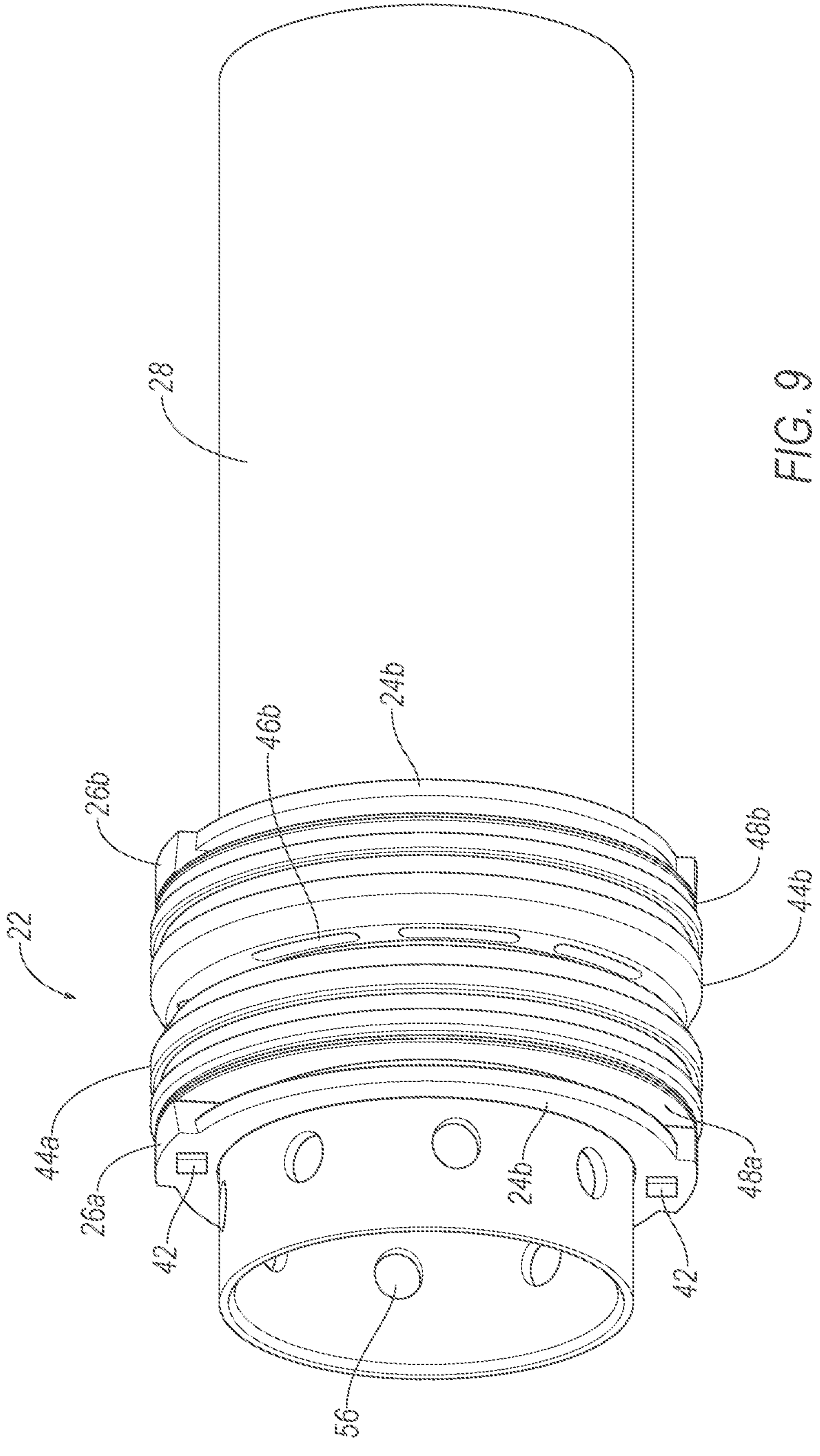
FIG. 9 is a perspective view of the assembly installed on an inner tube of the damper.

Next, at a step 630 the intake assembly 22 is installed onto the inner tube 28 of the damper 16. The intake assembly 22 may be installed by inserting the inner tube 28 into a central opening (not numbered) of the intake assembly 22, as shown in FIG. 9. The intake assembly 22 may be slid along the inner tube 28 to a desired position. For example, the intake assembly 22 may be slid along the inner tube 28 until the clamping ring 78 engages the groove 80 of the inner tube 28. The first valve discs 48*a*, the first valve ring 44*a*, the clamping ring 78, the second valve ring 44*b*, and the second valve discs 48*b* may be compressed between the unitary first support ring 24*a* and first pair of fulcrum spacers 26*a* and the unitary second support ring 24*b* and second pair of fulcrum spacers 26*b*. The compression may be provided by further riveting the support posts 42, tightening nuts engaged with the support posts 42, etc. The compression may urge the clamping ring 78 against the outer surface 66 of the inner tube 28. After the intake assembly 22 is installed onto the inner tube 28, assembly the damper 16 may be completed, e.g., with conventional methods.

The adjectives first, second, etc., are used throughout this document as identifiers and, unless explicitly stated otherwise, are not intended to signify importance, order, or quantity.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A damper, comprising:

an inner tube being elongated along an axis and having an outer cylindrical surface;

a piston slidably disposed in the inner tube;

an outer tube surrounding the inner tube and including an inner cylindrical surface facing the outer cylindrical surface, the inner tube and outer tube defining a fluid chamber therebetween; and an intake assembly positioned in the fluid chamber between the inner cylindrical surface and the outer cylindrical surface, the intake assembly including:

a unitary member having a support ring and pair of fulcrum spacers, a support post fixed to and extending along the axis away from the unitary member, a valve ring supported by the support post, the valve ring defining an orifice, and a valve disc supported by the support post between the valve ring and the unitary member, the valve disc covering the orifice of the valve ring.

2. The damper of claim 1, further comprising a second support ring, a second valve ring defining a second orifice, and a second valve disc covering the second orifice of the second valve ring, both the second valve ring and the second valve disc supported by the support post between the second support ring and the valve ring.

3. The damper of claim 2, wherein the outer tube defines an intake orifice between the valve ring and the second valve ring along the axis.

4. The damper of claim 2, further comprising a second pair of second fulcrum spacers unitary with the second support ring.

5. The damper of claim 4, wherein the support post extends from one fulcrum spacer of the pair of fulcrum spacers to one second fulcrum spacer of the second pair of second fulcrum spacers.

6. The damper of claim 5, further comprising a second support post extending from another fulcrum spacer of the pair of fulcrum spacers to another second fulcrum spacer of the second pair of second fulcrum spacers.

7. The damper of claim 1, wherein the pair of fulcrum spacers are spaced from each other 180-degrees about the support ring.

8. The damper of claim 1, wherein the pair of fulcrum spacers are thicker than the support ring along the axis.

9. An intake assembly supportable between an inner tube and an outer tube of a damper, the intake assembly comprising:

a unitary member having a support ring and pair of fulcrum spacers, the unitary member being configured to be radially positioned between an inner surface of the outer tube and an outer surface of the inner tube;

a second support ring;

a support post fixed to and extending away from the unitary member to the second support ring;

a valve ring supported by the support post, the valve ring defining an orifice; and a valve disc supported by the support post between the valve ring and the unitary member, the valve disc covering the orifice of the valve ring.

10. The intake assembly of claim 9, further comprising a second valve ring defining a second orifice and a second valve disc covering the second orifice of the second valve ring, both the second valve ring and the second valve disc supported by the support post between the second support ring and the valve ring.

11. The intake assembly of claim 10, wherein the valve ring is spaced from the second valve ring.

12. The intake assembly of claim 11, further comprising a clamping ring between the valve ring and the second valve ring.

13. The intake assembly of claim 10, further comprising a second pair of second fulcrum spacers unitary with the second support ring.

14. The intake assembly of claim 13, wherein the support post extends from one fulcrum spacer of the pair of fulcrum spacers to one second fulcrum spacer of the second pair of second fulcrum spacers.

15. The intake assembly of claim 14, further comprising a second support post extending from another fulcrum spacer of the pair of fulcrum spacers to another second fulcrum spacer of the second pair of second fulcrum spacers.

16. The intake assembly of claim 9, wherein the pair of fulcrum spacers are spaced from each other 180-degrees about the support ring.

17. The intake assembly of claim 9, wherein the pair of fulcrum spacers are thicker than the support ring.

18. A method, comprising:

installing a first valve disc, a first valve ring, a clamping ring, a second ring, and a second valve disc onto a pair of posts attached to a unitary member having a support ring and pair of fulcrum spacers; and then securing another unitary member having a second support ring and second pair of fulcrum spacers to the posts opposite the unitary member to provide an intake assembly.

19. The method of claim 18, further comprising installing the intake assembly onto an inner tube of a damper.

20. The method of claim 19, further comprising securing the intake assembly to the inner tube by compressing the first valve disc, the first valve ring, the clamping ring, the second ring, and the second valve disc between the unitary member and the another unitary member.

* * * * *